(12) United States Patent
Johnson et al.

(10) Patent No.: US 10,427,593 B2
(45) Date of Patent: Oct. 1, 2019

(54) VEHICLE LIGHT ASSEMBLY

(71) Applicant: Ford Global Technologies, LLC, Dearborn, MI (US)

(72) Inventors: Aaron Bradley Johnson, Allen Park, MI (US); Stuart C. Salter, White Lake, MI (US); Paul Kenneth Dellock, Northville, MI (US); Stephen Kenneth Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 15/454,097

(22) Filed: Mar. 9, 2017

(65) Prior Publication Data
US 2018/0222381 A1    Aug. 9, 2018

Related U.S. Application Data

(63) Continuation-in-part of application No. 15/428,569, filed on Feb. 9, 2017, now Pat. No. 9,896,023.

(51) Int. Cl.
| | |
|---|---|
| *B60Q 1/00* | (2006.01) |
| *B60Q 1/22* | (2006.01) |
| *B60Q 1/24* | (2006.01) |
| *B60Q 1/30* | (2006.01) |
| *B60Q 1/34* | (2006.01) |
| *F21S 43/14* | (2018.01) |
| *F21S 43/20* | (2018.01) |
| *F21S 43/37* | (2018.01) |

(52) U.S. Cl.
CPC .......... *B60Q 1/346* (2013.01); *B60Q 1/0076* (2013.01); *B60Q 1/22* (2013.01); *B60Q 1/24* (2013.01); *B60Q 1/30* (2013.01); *F21S 43/14* (2018.01); *F21S 43/37* (2018.01); *B60Q 2400/10* (2013.01); *B60Q 2400/40* (2013.01); *B60Q 2900/00* (2013.01); *F21S 43/20* (2018.01)

(58) Field of Classification Search
CPC ........ B60Q 1/346; B60Q 1/0076; B60Q 1/22; B60Q 1/24; B60Q 1/30; F21S 43/37; F21S 43/20; F21S 43/14
USPC .......................................................... 362/36
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,434,013 A | 7/1995 | Fernandez |
| 5,709,453 A | 1/1998 | Krent et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Mary Ellen Bowman
(74) *Attorney, Agent, or Firm* — Vichit Chea; Price Heneveld LLP

(57) ABSTRACT

A light assembly is provided herein. The light assembly includes a pair of light assemblies disposed on opposing sides of a rear portion of a vehicle. Each light assembly includes a housing and a lens. A light source is disposed in the housing and is configured to create a first predefined illumination pattern. A controller is configured to selectively activate the first illumination pattern from one of the pair of housings corresponding to a direction of a vehicle steering wheel rotation.

20 Claims, 9 Drawing Sheets

(56) References Cited

U.S. PATENT DOCUMENTS

| | | | |
|---|---|---|---|
| 5,839,718 A | 11/1998 | Hase et al. | |
| 6,031,511 A | 2/2000 | DeLuca et al. | |
| 6,117,362 A | 9/2000 | Yen et al. | |
| 6,243,008 B1 | 6/2001 | Korabiak | |
| 6,294,990 B1 | 9/2001 | Knoll et al. | |
| 6,419,854 B1 | 7/2002 | Yocom et al. | |
| 6,441,943 B1* | 8/2002 | Roberts | B60Q 1/2665 359/267 |
| 6,494,490 B1 | 12/2002 | Trantoul | |
| 6,577,073 B2 | 6/2003 | Shimizu et al. | |
| 6,700,481 B2 | 3/2004 | Pan | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |
| 7,287,884 B2 | 10/2007 | Koike | |
| 7,347,576 B2 | 3/2008 | Wang et al. | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,726,856 B2 | 6/2010 | Tsutsumi | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,893,865 B2* | 2/2011 | Natsume | B60Q 1/0023 342/104 |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2* | 11/2011 | Bucher | B60Q 1/0052 362/511 |
| 8,071,988 B2 | 12/2011 | Lee et al. | |
| 8,097,843 B2 | 1/2012 | Agrawal et al. | |
| 8,118,441 B2 | 2/2012 | Hessling | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,169,131 B2 | 5/2012 | Murazaki et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,261,686 B2 | 9/2012 | Birman et al. | |
| 8,286,378 B2 | 10/2012 | Martin et al. | |
| 8,317,329 B2 | 11/2012 | Seder et al. | |
| 8,317,359 B2 | 11/2012 | Harbers et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,459,832 B2 | 6/2013 | Kim | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,539,702 B2 | 9/2013 | Li et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,653,553 B2 | 2/2014 | Yamazaki et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,905,610 B2 | 12/2014 | Coleman et al. | |
| 8,952,341 B2 | 2/2015 | Kingsley et al. | |
| 8,994,495 B2 | 3/2015 | Dassanayake et al. | |
| 9,006,751 B2 | 4/2015 | Kleo et al. | |
| 9,018,833 B2 | 4/2015 | Lowenthan et al. | |
| 9,057,021 B2 | 6/2015 | Kingsley et al. | |
| 9,059,378 B2 | 6/2015 | Verger et al. | |
| 9,065,447 B2 | 6/2015 | Buttolo et al. | |
| 9,067,530 B2 | 6/2015 | Bayersdorfer et al. | |
| 9,187,034 B2 | 11/2015 | Tarahomi et al. | |
| 9,299,887 B2 | 3/2016 | Lowenthal et al. | |
| 9,315,148 B2 | 4/2016 | Schwenke et al. | |
| 9,452,709 B2 | 9/2016 | Aburto Crespo | |
| 9,568,659 B2 | 2/2017 | Verger et al. | |
| 9,616,812 B2 | 4/2017 | Sawayanagi | |
| 2002/0159741 A1 | 10/2002 | Graves et al. | |
| 2002/0163792 A1 | 11/2002 | Formoso | |
| 2003/0167668 A1 | 9/2003 | Kuks et al. | |
| 2003/0179548 A1 | 9/2003 | Becker et al. | |
| 2004/0213088 A1 | 10/2004 | Fuwausa | |
| 2005/0084229 A1 | 4/2005 | Babbitt et al. | |
| 2005/0189795 A1 | 9/2005 | Roessler | |
| 2005/0195073 A1* | 9/2005 | Subbaraman | B60Q 1/346 340/465 |
| 2006/0087826 A1 | 4/2006 | Anderson, Jr. | |
| 2006/0097121 A1 | 5/2006 | Fugate | |
| 2007/0032319 A1 | 2/2007 | Tufte | |
| 2007/0285938 A1 | 12/2007 | Palmer et al. | |
| 2007/0297045 A1 | 12/2007 | Sakai et al. | |
| 2008/0205005 A1* | 8/2008 | Chen | G01R 31/2808 361/719 |
| 2008/0205075 A1 | 8/2008 | Hikmet et al. | |
| 2009/0217970 A1 | 9/2009 | Zimmerman et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2010/0102736 A1 | 4/2010 | Hessling | |
| 2011/0012062 A1 | 1/2011 | Agrawal et al. | |
| 2011/0265360 A1 | 11/2011 | Podd et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2012/0299476 A1* | 11/2012 | Roberts | B60Q 1/0011 315/77 |
| 2013/0010484 A1* | 1/2013 | Son | B60Q 1/346 362/464 |
| 2013/0050979 A1 | 2/2013 | Van De Ven et al. | |
| 2013/0092965 A1 | 4/2013 | Kijima et al. | |
| 2013/0335994 A1 | 12/2013 | Mulder et al. | |
| 2014/0003044 A1 | 1/2014 | Harbers et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0211498 A1 | 7/2014 | Cannon et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0085488 A1 | 3/2015 | Grote, III et al. | |
| 2015/0109602 A1 | 4/2015 | Martin et al. | |
| 2015/0138789 A1 | 5/2015 | Singer et al. | |
| 2015/0251592 A1 | 9/2015 | Fisher | |
| 2015/0267881 A1 | 9/2015 | Salter et al. | |
| 2015/0307033 A1 | 10/2015 | Preisler et al. | |
| 2015/0353003 A1* | 12/2015 | Salter | B60Q 1/268 362/510 |
| 2016/0016506 A1 | 1/2016 | Collins et al. | |
| 2016/0102819 A1 | 4/2016 | Misawa et al. | |

(56) References Cited

U.S. PATENT DOCUMENTS

| | | |
|---|---|---|
| 2016/0131327 A1 | 5/2016 | Moon et al. |
| 2016/0236613 A1 | 8/2016 | Trier |
| 2016/0240794 A1 | 8/2016 | Yamada et al. |
| 2016/0339833 A1* | 11/2016 | Uchida ................ F21S 41/338 |
| 2017/0001554 A1* | 1/2017 | Sorensen ............... B60Q 1/346 |
| 2017/0158125 A1 | 6/2017 | Schuett et al. |
| 2017/0253179 A1 | 9/2017 | Kumada |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 102004060026 A1 | 6/2006 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 9806975 | 2/1998 |
| WO | 2006047306 A1 | 5/2006 |
| WO | 2014068440 A1 | 5/2014 |
| WO | 2014161927 A1 | 10/2014 |

* cited by examiner

VEHICLE LIGHT ASSEMBLY

CROSS-REFERENCE TO RELATED APPLICATION

This application is a continuation-in-part of U.S. patent application Ser. No. 15/428,569, filed Feb. 9, 2017, and entitled "ILLUMINATED ASSEMBLY." The aforementioned related application is hereby incorporated by reference as if fully set forth herein.

FIELD OF THE INVENTION

The present invention generally relates to vehicular lighting, and more particularly to vehicle lighting assemblies disposed on an exterior portion of the vehicle.

BACKGROUND OF THE INVENTION

Vehicular lighting assemblies are generally installed on exterior portions of a vehicle and may notify proximately disposed vehicles of an intended action of the driver of the vehicle. It is therefore desired to implement improved lighting assemblies for further assistance in providing notifications.

SUMMARY OF THE INVENTION

According to one aspect of the present disclosure, a light assembly is disclosed. The light assembly includes a pair of light assemblies disposed on opposing sides of a rear portion of a vehicle. Each light assembly includes a housing and a lens. A light source is disposed in the housing and is configured to create a first predefined illumination pattern. A controller is configured to selectively activate the first illumination pattern from one of the pair of housings corresponding to a direction of a vehicle steering wheel rotation.

According to another aspect of the present disclosure, a light assembly is disclosed that includes a housing and a plurality of light sources disposed within the housing and configured to emit light through a lens. The light assembly further includes a plurality of reflectors. Each light source is operably coupled with an independent reflector that is angularly offset from the remaining reflectors. A controller is configured to selectively illuminate the light sources as a vehicle alters its direction.

According to yet another aspect of the present disclosure, a vehicle light assembly is disclosed. The light assembly includes a housing and a lens. A light source is disposed within the housing and is configured to emit an illumination pattern rearwardly and laterally outward of the vehicle. A controller is configured to selectively illuminate the light source when a vehicle steering wheel is rotated without initiation of a vehicle turn signal indicator lamp.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
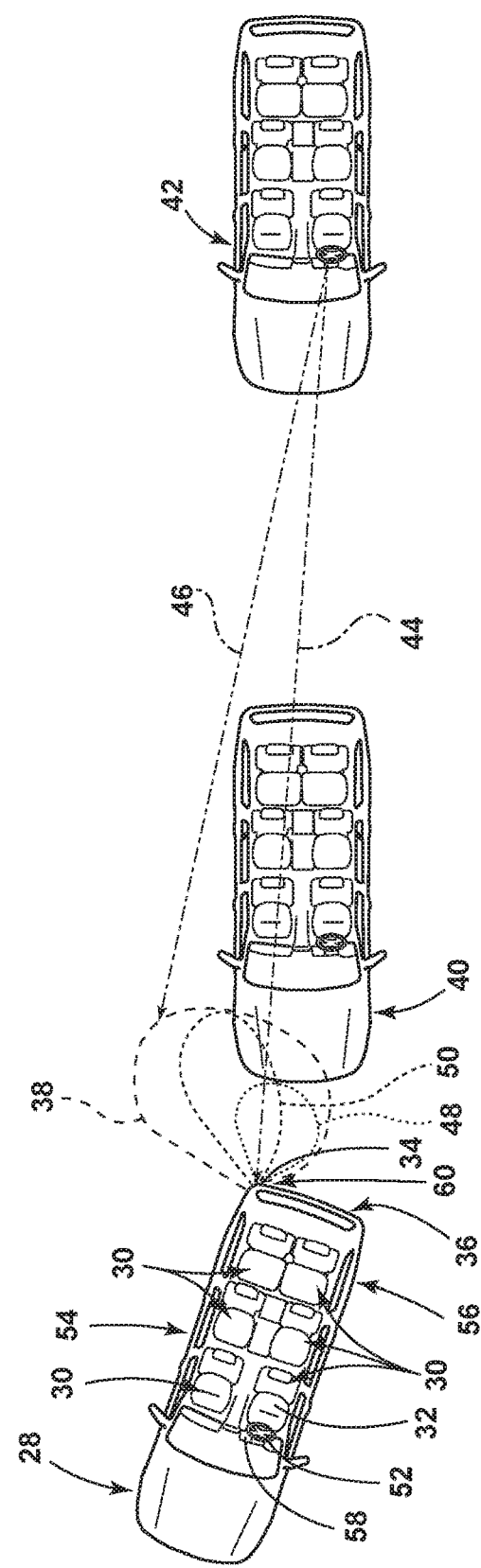
FIG. 2 is a top plan view of a vehicle employing a light assembly and two vehicles disposed rearwardly of the vehicle, according to various embodiments.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a light assembly for a vehicle. In various embodiments, the light assembly alters an illumination pattern based on a wide array of vehicle conditions. The light assembly may advantageously employ one or more phosphorescent and/or luminescent structures to illuminate in response to predefined events. The one or more luminescent structures may be configured to convert excitation light received from an associated light source and re-emit the light at a different wavelength typically found in the visible spectrum.

Figure 1A:
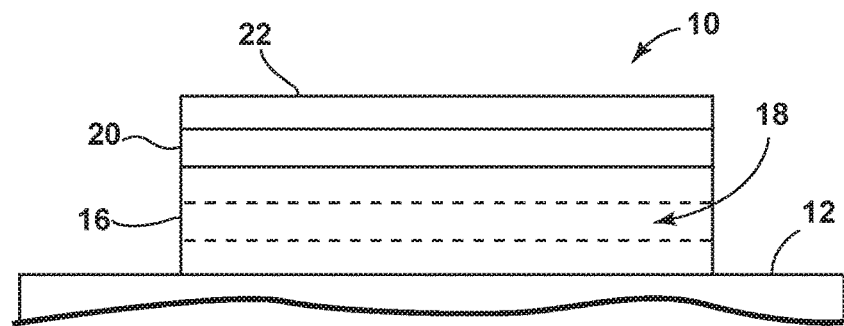
FIG. 1A is a side view of a luminescent structure rendered as a coating, according to various embodiments.
Figure 1B:
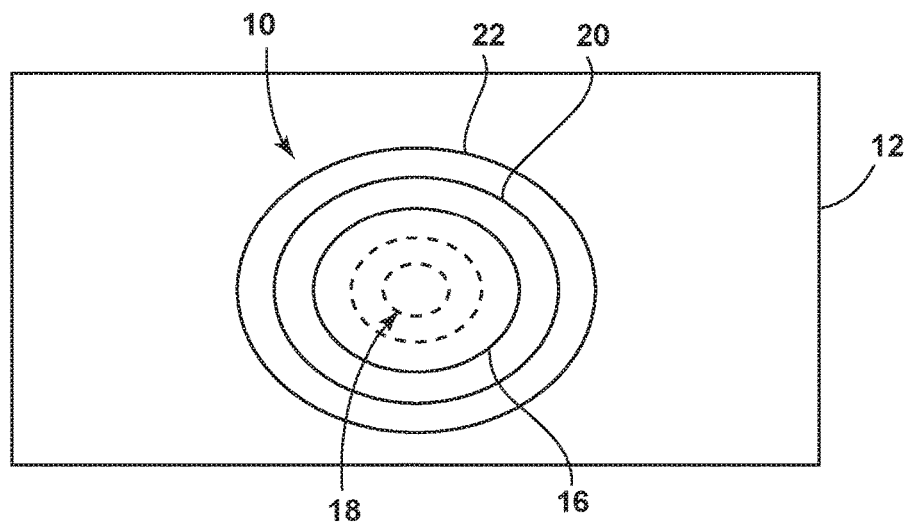
FIG. 1B is a top view of a luminescent structure rendered as a discrete particle according to various embodiments.
Figure 1C:
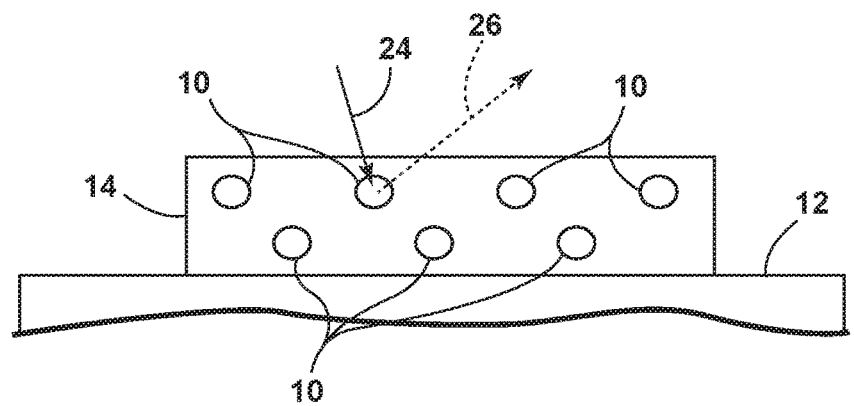
FIG. 1C is a side view of a plurality of luminescent structures rendered as discrete particles and incorporated into a separate structure.

Referring to FIGS. 1A-1C, various exemplary embodiments of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown through broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by a light source 80 (FIG. 7) may be referred to herein as excitation light 24 and is illustrated herein as solid arrows. In contrast, light emitted from the luminescent structure 10 may be referred to herein as converted light 26 and may be illustrated herein as broken arrows.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various embodiments, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of luminescent structures 10 is disclosed in U.S. Pat. No. 8,232,533 to Kingsley et al., the entire disclosure of which is incorporated herein by reference. For additional information regarding fabrication and utilization of luminescent materials to achieve various light emissions, refer to U.S. Pat. No. 8,207,511 to Bortz et al., U.S. Pat. No. 8,247,761 to Agrawal et al., U.S. Pat. No. 8,519,359 to Kingsley et al., U.S. Pat. No. 8,664,624 to Kingsley et al., U.S. Patent Publication No. 2012/0183677 to Agrawal et al., U.S. Pat.

No. 9,057,021 to Kingsley et al., and U.S. Pat. No. 8,846,184 to Agrawal et al., all of which are incorporated herein by reference in its entirety.

According to various embodiments, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to various embodiments, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various embodiments, the rare earth aluminum garnet type Ce phosphor may serve as the luminescent material 18 with ultra-short-persistence characteristics, which can emit the converted light 26 by absorbing purple to blue excitation light 24 emitted from the light sources 80. According to various embodiments, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein. Additional information regarding the production of short-persistence luminescent materials is disclosed in U.S. Pat. No. 8,163,201 to Agrawal et al., the entire disclosure of which is incorporated herein by reference.

Additionally, or alternatively, the luminescent material 18, according to various embodiments, disposed within the luminescent structure 10 may include a long-persistence luminescent material 18 that emits the converted light 26, once charged by the excitation light 24. The excitation light 24 may be emitted from any excitation source (e.g., any natural light source, such as the sun, and/or any artificial light sources 80). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to various embodiments, may be operable to emit light at or above an intensity of 0.32 mcd/m² after a period of 10 minutes. Additionally, the long-persistence luminescent material 18 may be operable to emit light above or at an intensity of 0.32 mcd/m² after a period of 30 minutes and, in various embodiments, for a period substantially longer than 60 minutes (e.g., the period may extend 24 hours or longer, and in some instances, the period may extend 48 hours). Accordingly, the long-persistence luminescent material 18 may continually illuminate in response to excitation from any light sources 80 that emit the excitation light 24, including, but not limited to, natural light sources (e.g., the sun) and/or any artificial light sources 80. The periodic absorption of the excitation light 24 from any excitation source may provide for a substantially sustained charge of the long-persistence luminescent material 18 to provide for consistent passive illumination. In various embodiments, a light sensor may monitor the illumination intensity of the luminescent structure 10 and actuate an excitation source when the illumination intensity falls below 0.32 mcd/m², or any other predefined intensity level.

The long-persistence luminescent material 18 may correspond to alkaline earth aluminates and silicates, for example, doped di-silicates, or any other compound that is capable of emitting light for a period of time once the excitation light 24 is no longer present. The long-persistence luminescent material 18 may be doped with one or more ions, which may correspond to rare earth elements, for example, Eu2+, Tb3+, and/or Dy3. According to one non-limiting exemplary embodiment, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various embodiments, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to various embodiments, a blue emitting phosphorescent material may have the structure $Li_2ZnGeO_4$ and may be prepared by a high-temperature solid-state reaction method or through any other practicable method and/or process. The afterglow may last for a duration of 2-8 hours and may originate from the excitation light 24 and d-d transitions of Mn2+ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Additional information regarding the production of long-persistence luminescent materials is disclosed in U.S. Pat. No. 8,163,201 to Agrawal et al., the entire disclosure of which is incorporated herein by reference. For additional information regarding long-persistence phosphorescent structures, refer to U.S. Pat. No. 6,953,536 to Yen et al., U.S.

Pat. No. 6,117,362 to Yen et al., and U.S. Pat. No. 8,952,341 to Kingsley et al., all of which are incorporated herein by reference in their entirety.

Referring to FIG. 2, a vehicle 28 is shown in a form of a passenger car having a plurality of defined vehicle seats 30, including a driver's seat 32. The vehicle 28 may include any wheeled vehicle, such as a car, a truck, a bus, etc. without departing from the scope of the disclosure. The vehicle 28 may be further equipped with a light assembly 34 on a rear portion 36 of the vehicle 28. Each light assembly 34 emanates an illumination pattern that extends laterally outward and/or rearwardly of the vehicle 28 to notify proximately disposed vehicles 40, 42 of an imminent change in vehicle condition.

As illustrated in FIG. 2, the vehicle 28 may begin to alter its direction by turning to the right. A rearwardly disposed second vehicle 40 immediately behind the vehicle 28 may visibly perceive the change of the vehicle 28 and accommodate accordingly. However, the change of the vehicle 28 may not be visible to a third vehicle 42, disposed behind the second vehicle 40. The change may not be visible from a driver's seat 32 of the third vehicle 42 due to the second vehicle 40 blocking a view 44 of the vehicle's turn signal indicator lamp 60. Accordingly, the light assembly 34 may provide a wider illumination pattern 38 that is visible to the third vehicle 42 through a laterally outward sight line 46. The illumination pattern 38 may be wider and/or longer than a turn indicator light cone 48 and/or a brake lamp light cone 50. It will be appreciated that the illumination pattern 38 described herein may form a light cone, which may be described as a surface in space-time, represented as a cone in three dimensions, comprising the points from which a light signal would reach a given point (at the apex) simultaneously, and that therefore appear simultaneous to an observer at the apex. Moreover, the light cone may be of any geometry without departing from the scope of the present disclosure.

According to various embodiments, the illumination pattern 38 may be emitted from the light assembly 34 that corresponds to a direction of rotation of a vehicle steering wheel 52, or other direction altering activity of the vehicle 28. For example, as the steering wheel 52 is rotated to the right, the light assembly 34 proximate a right lateral side 54 of the vehicle 28 may project the illumination pattern 38 therefrom. Conversely, as the steering wheel 52 is rotated to the left, a light assembly 34 proximate a left lateral side 56 of the vehicle 28 may project the illumination pattern 38. In various embodiments, the light assembly 34 is activated when the vehicle steering wheel 52 is rotated and the vehicle turn signal indicator light lever 58 and/or indicator signal indicator lamp 60 has not been activated.

Referring to FIGS. 3-6, the light assembly 34 may be mounted on and/or integrated with the rear portion 36 of the vehicle 28 in either a horizontal or a vertical orientation. The light assembly 34 may be disposed within a tail lamp assembly 68 with a brake lamp 62, a running lamp 64, the turn signal indicator lamp 60, a backup lamp 66, any other lamp that may be disposed on the exterior and/or interior of the vehicle 28, and/or combinations thereof. The general shape and appearance of the light assembly 34 and lamps (e.g., 60, 62, 64, 66) provided herein is by way of example only, as the light assembly 34 may be configured in any practicable shape and include any number of lamps (e.g., 60, 62, 64, 66) therein that perform any function without departing from the scope of the present disclosure.

Figure 3:
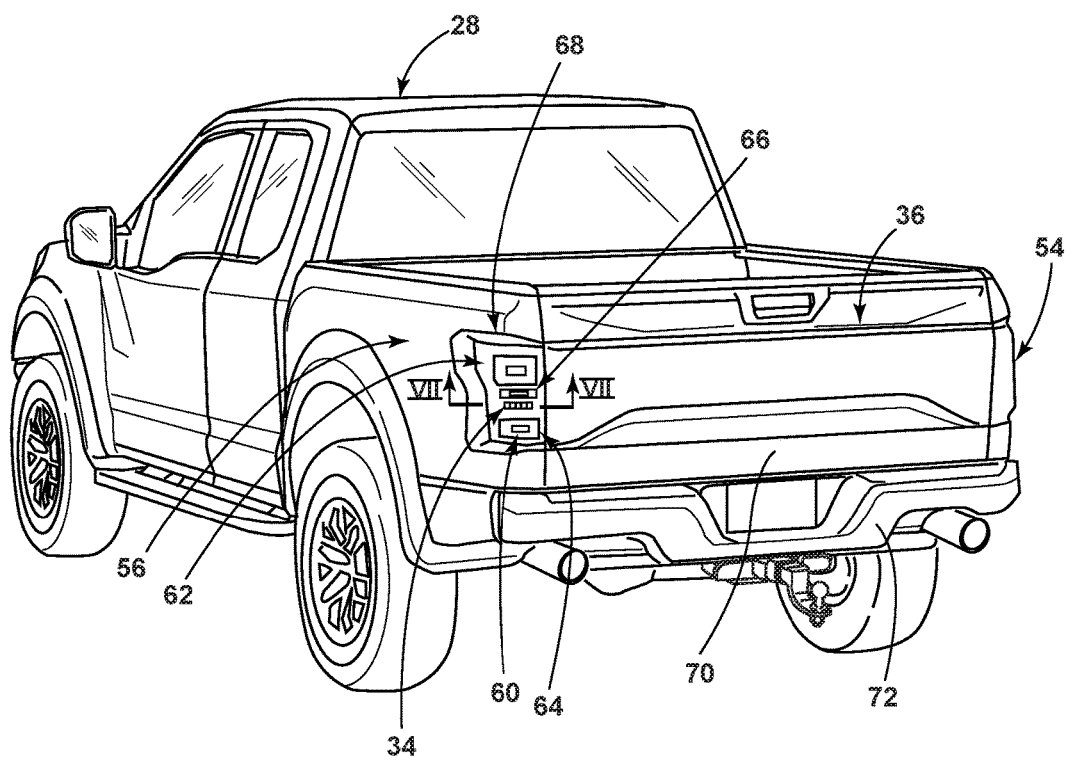
FIG. 3 is a rear perspective view of a vehicle employing the light assembly within a tail lamp assembly, according to various embodiments.
Figure 4:
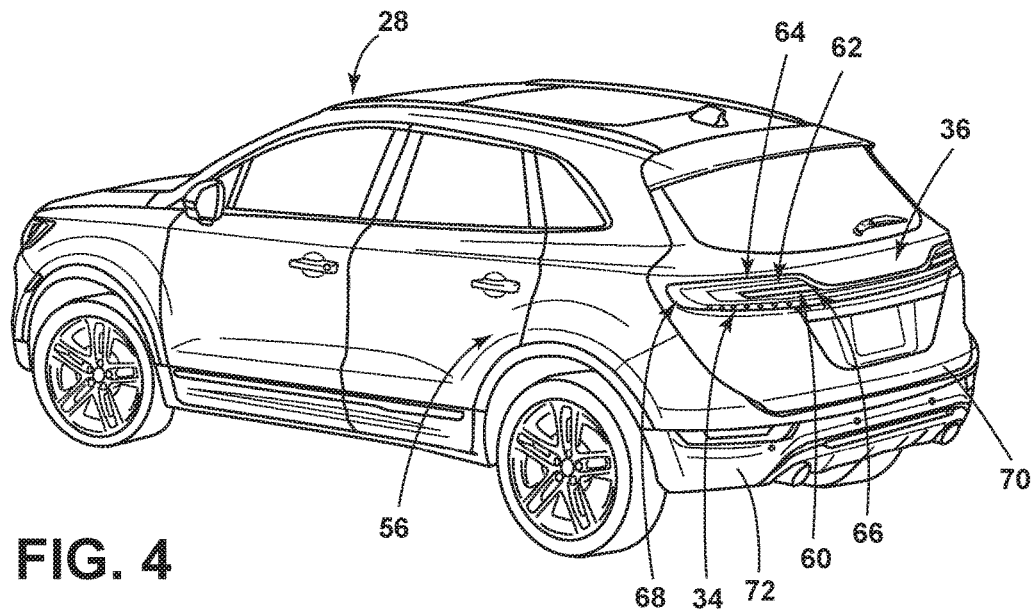
FIG. 4 is a rear perspective view of a vehicle employing the light assembly within a tail lamp assembly on a vehicle tailgate, according to various embodiments.
Figure 5:
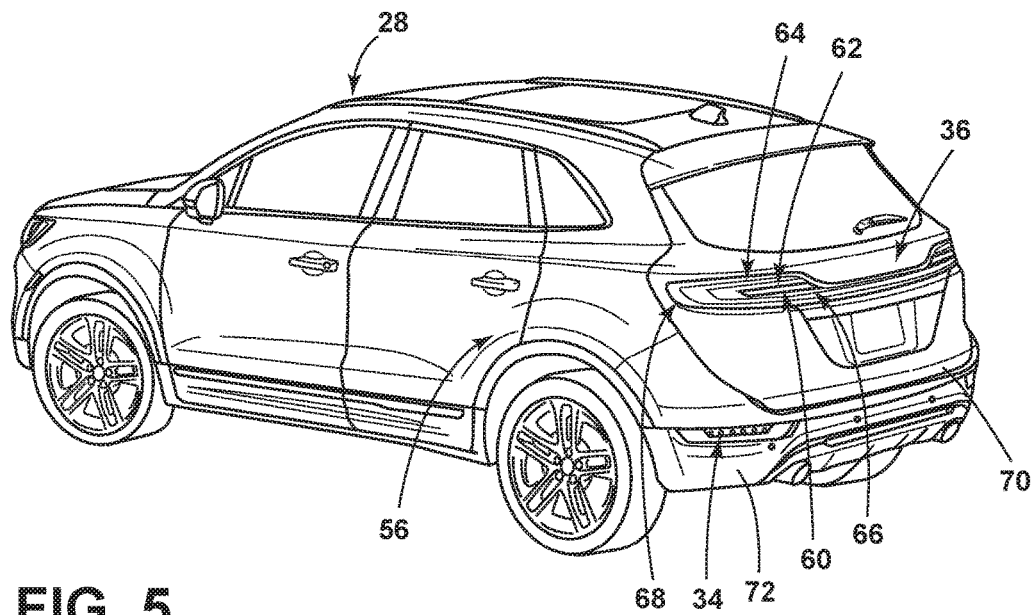
FIG. 5 is a rear perspective view of a vehicle employing the light assembly on a bumper, according to various embodiments.
Figure 6:
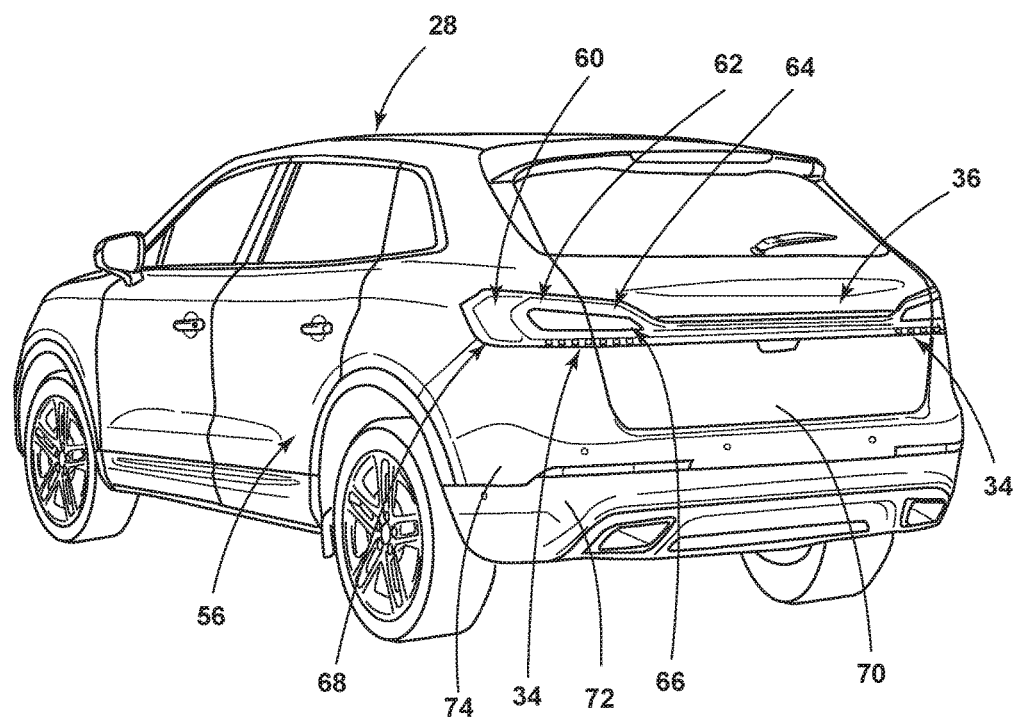
FIG. 6 is a rear perspective view of a vehicle employing the light assembly within a tail lamp assembly extending within a vehicle body panel and the vehicle tailgate, according to various embodiments.

The light assembly 34 may be located at other locations on the vehicle 28 and may be disposed at multiple locations of the vehicle 28 and function in conjunction with one another. For example, as illustrated in FIG. 3, the light assembly 34 may be integrated into a rear taillight assembly. Additionally, or alternatively, as illustrated in FIG. 4, the light assembly 34 may be disposed on a tailgate 70 of the vehicle 28. Additionally, or alternatively, as illustrated in FIG. 5, the light assembly 34 may be disposed within a rear bumper 72 of the vehicle 28. Additionally, or alternatively, as illustrated in FIG. 6, the light assembly 34 may be disposed within the tail lamp assembly 68 that is disposed both on the tailgate 70 and within a body panel 74 of the vehicle 28. In any event, the light assembly 34 may be configured to direct light laterally outward of the turn signal light cone 48 and/or a brake light cone 50.

Referring still to FIGS. 3-6, the light assembly 34 may include one or more light sources 80 therein. As will be described in greater detail below, each light source 80 includes a focal axis 86 (FIG. 7) that may be offset from the remaining light sources 80 such that the light assembly 34 may illuminate in a wide range of directions and/or illumination patterns 38 based on the light sources 80 illuminated. As illustrated, the light assembly 34 includes five light sources 80 therein that are laterally arranged with one another. However, it will be appreciated that the light assembly 34 may include any number (one or more) of light sources 80.

Figure 7:
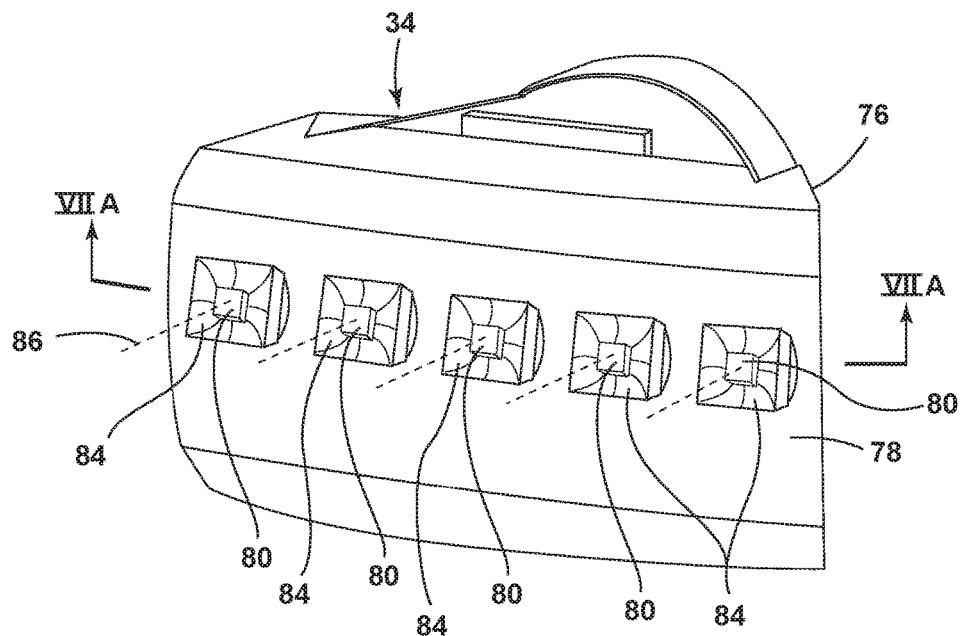
FIG. 7 is a perspective view of the lighting assembly, according to various embodiments, incorporating a plurality of light sources.
Figure 7A:
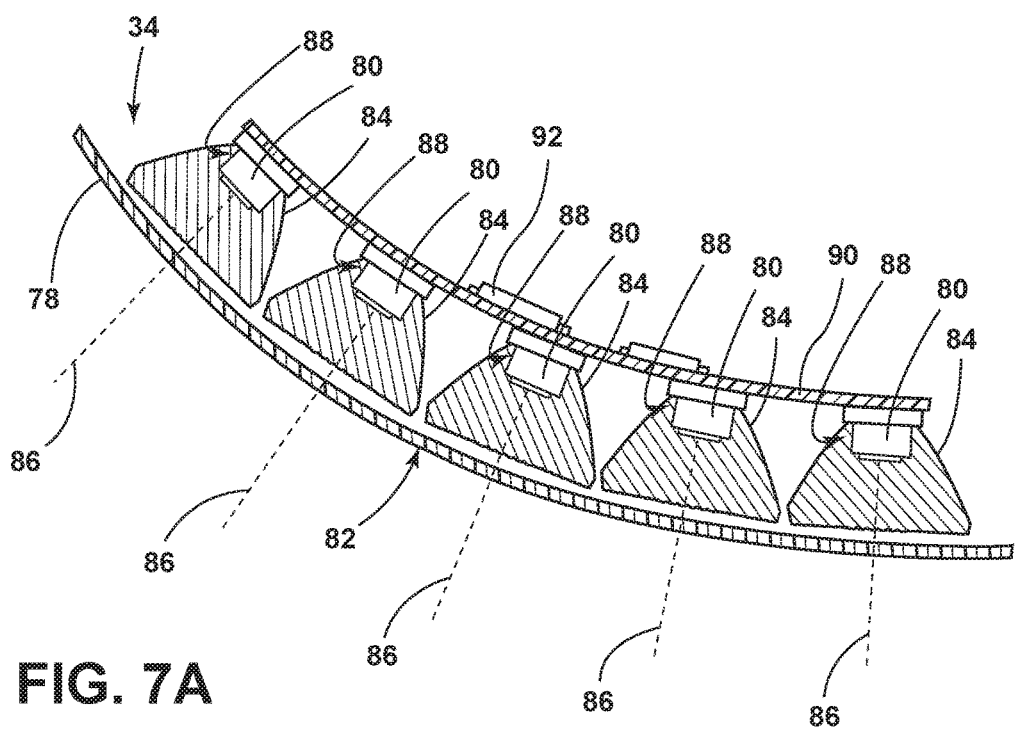
FIG. 7A is a cross-sectional view of the light assembly taken along the line VIIA-VIIA of FIG. 7.
Figure 7B:
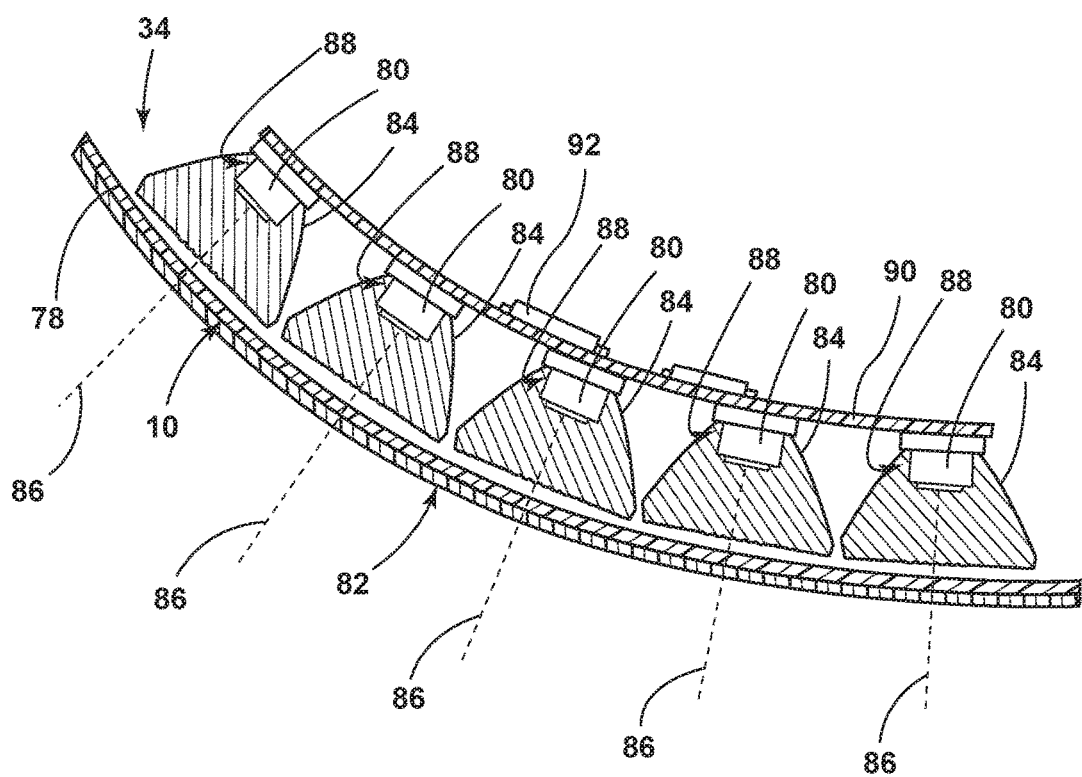
FIG. 7B is a cross-sectional view of the light assembly taken along the line VIIA-VIIA of FIG. 7 incorporating a luminescent structure, according to various embodiments.

Referring to FIGS. 7-7B, the light assembly 34 includes a housing 76 and a transparent and/or translucent lens 78 covering the front side of the housing 76. The lens 78 may be fabricated from an optically transparent and/or translucent material, such as polycarbonate, glass, or other translucent materials with high optical quality and capable of being manufactured to tight tolerances. One or more light sources 80 are disposed between the housing 76 and the lens 78. Optics 82 may be arranged on and/or within the lens 78 such that excitation light 24 output by the light sources 80 is directed towards a desired location. For example, the optics 82 may be configured as a Fresnel lens, a pillow optic, and/or any other type of lens or optic that is configured to disperse, concentrate, and/or otherwise direct excitation light 24 emitted from the light assembly 34 in any desired manner.

The one or more light sources 80 may be configured to emit visible and/or non-visible light, such as blue light, UV light, infrared light, and/or violet light and may include any form of light source 80. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the light assembly 34. Further, various types of LEDs are suitable for use as the light sources 80 including, but not limited to, top-emitting LEDs, side-emitting LEDs, and others. Excitation light 24 generated by the one or more light sources 80 passes generally through the lens 78 of the housing 76 to the outside environment when one or more light sources 80 is illuminated.

The light assembly 34 may further include one or more reflectors 84, such as a parabolic reflector, generally operably coupled with each light source 80. The one or more reflectors 84 may be formed from a polymeric material or any other suitable material known in the art. Each light source 80 may be surrounded by an independent reflector 84 that generates a focal axis 86 that may be focally offset from the remaining reflectors 84 such that a wide variety of light patterns may be generated. It should be appreciated that the reflector 84 may be one or more separate components disposed within the housing 76.

The reflectors 84 may be formed integrally, as depicted, and each may include an aperture 88 aligned with the corresponding light source 80. The reflectors 84 are utilized for reflecting and redirecting incidental light rays from the light sources 80 for focusing the illumination in a targeted direction. The reflectors 84 and corresponding light sources 80 are oriented to convey light rearwardly, laterally outboard, and above/below the light assembly 34 for illuminating an expanded illumination pattern 38 and for conveying a turn direction of the vehicle 28 to viewers in various directions with respect to the vehicle 28. The light sources 80 can also be controlled and operated separately for providing clearance illumination rearward of the vehicle 28, which may provide assistance in trailering and towing operations.

The light assembly 34 may include a printed circuit board (PCB) 90 containing a controller 92 including control circuitry including LED drive circuitry for controlling activation and deactivation of the light sources 80. The PCB 90 may be any type of circuit board including, but not limited to, any flexible PCB and/or rigid PCB. According to various embodiments, the PCB 90 may have a cross-sectional shape that is substantially similar to that of the lens 78.

Referring to FIG. 7B, the luminescent structure 10 may be disposed between the light source 80 and the lens 78. In operation, the luminescent structure 10 may include a plurality of luminescent materials 18 therein that luminesce in response to receiving light of a specific wavelength. According to various embodiments, the luminescent structure 10 discussed herein is substantially Lambertian; that is, the apparent brightness of the luminescent structure 10 is substantially constant regardless of an observer's angle of view. As described herein, the color of the converted light 26 may be dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues.

Figure 8:
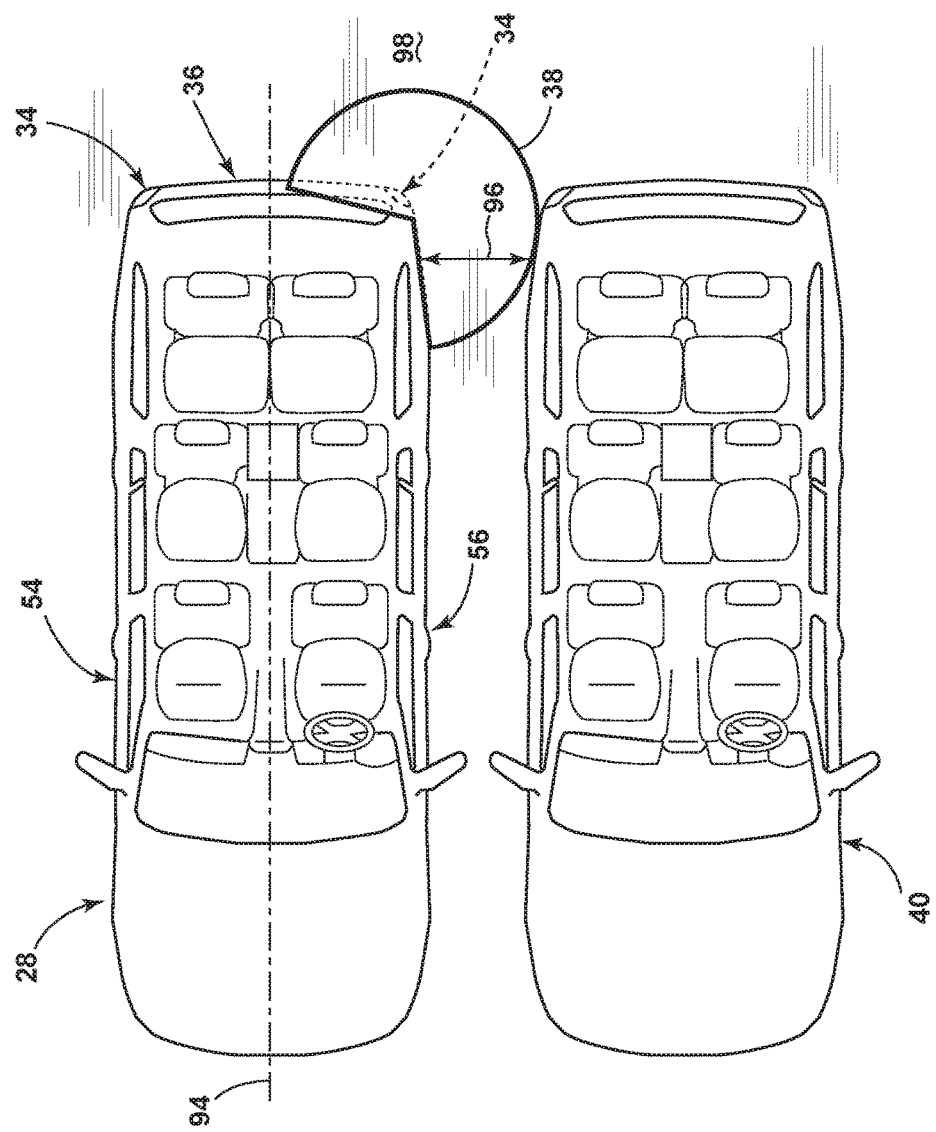
FIG. 8 illustrates the vehicle disposed laterally adjacent to a second vehicle wherein the light assembly illuminates a space between the two vehicles.

Referring to FIG. 8, the light assembly 34 may be installed, possibly symmetrically on the opposing lateral sides 54, 56 of a vehicle centerline 94. In other words, suitably reflected light distributions may be generated next to the vehicle 28 on both the lateral sides 54, 56 of the vehicle 28. The illumination pattern 38 may be utilized during a welcome/farewell sequence, meaning the light assembly 34 may be illuminated as the driver and/or an occupant of the vehicle 28 approaches and/or exits the vehicle 28. The light assembly 34 may illuminate a space 96 between the vehicle 28 and proximately parked vehicles 40 and/or an area disposed rearwardly of the vehicle 28. In addition, the light assembly 34 may illuminate a ground surface 98 next to the vehicle 28 to enhance visibility, safety, aesthetics, etc. of the vehicle 28.

Figure 9:
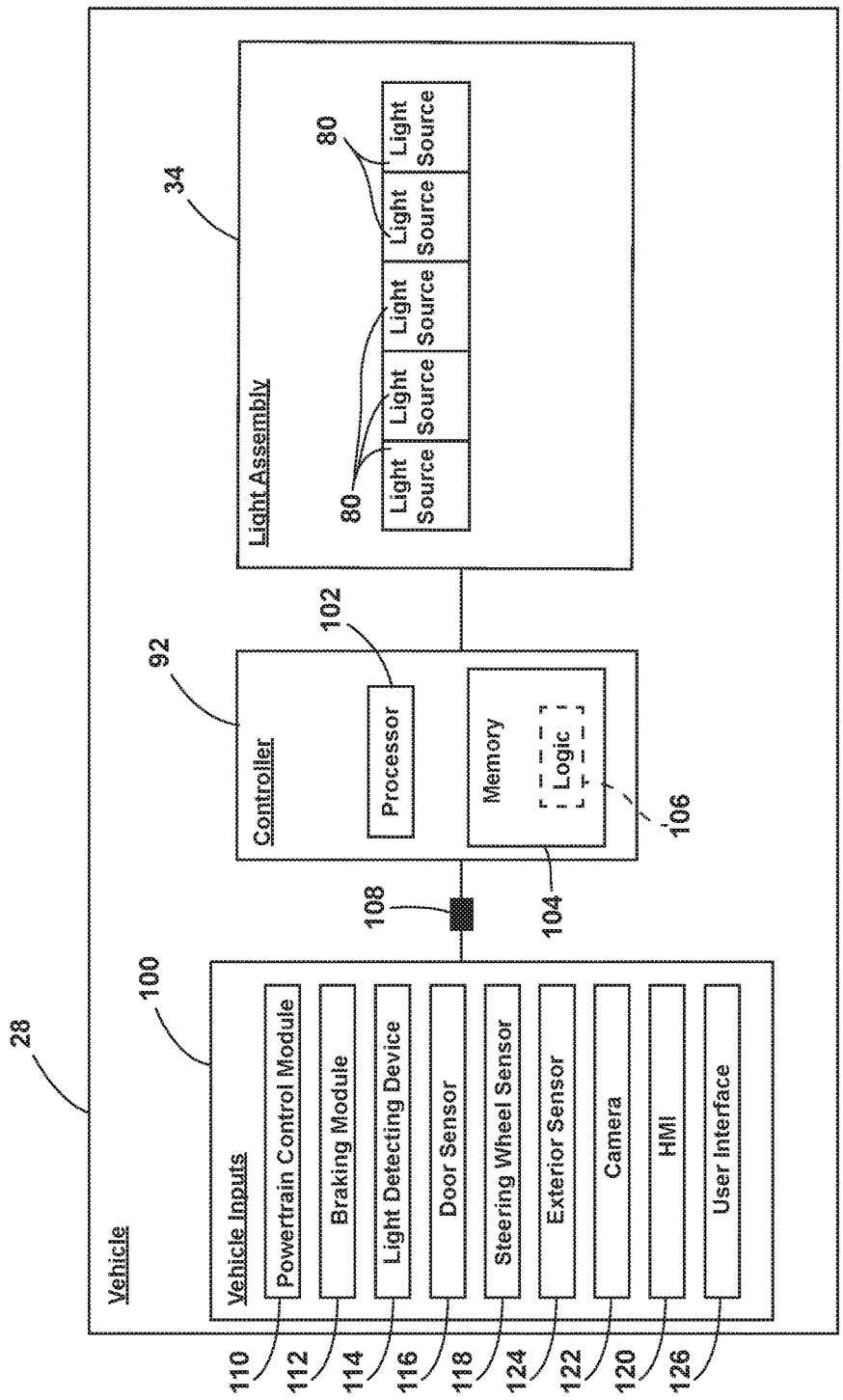
FIG. 9 is a block diagram of the vehicle incorporating the light assembly, according to various embodiments.

Referring to FIG. 9, the light assembly 34 is further illustrated having the controller 92 receiving various inputs 100 and controlling each of the light sources 80, by applying signals to the light sources 80. The controller 92 may include a processor 102 and memory 104 as illustrated, according to various embodiments. It should be appreciated that the controller 92 may include control circuitry such as analog and/or digital control circuitry. Stored within memory 104 and executed by the processor 102 is logic 106 for processing the various inputs 100 and controlling each of the light sources 80.

One or more vehicle inputs 100 may communicate with the light assembly 34 through a multiplex communication bus 108. The multiplex communication bus 108 may be disposed within the tail lamp assembly 68, the light assembly 34, and/or the vehicle 28. According to various embodiments, the various inputs 100 include, but are not limited to, a powertrain control module 110, a braking module 112, a light-detecting device 114, a door sensor 116, a steering wheel position sensor 118, a human-machine interface (HMI) 120, a camera 122, and/or one or more exterior sensors 124 disposed on the vehicle 28.

The powertrain control module 110 may be utilized for determining the direction of movement of the vehicle 28 and/or transmission status of the vehicle 28. For example, the powertrain control module 110 may provide the controller 92 with information relating to vehicle directional movement. For example, the powertrain control module 110 may detect the vehicle 28 moving in a rearward direction. In response, the controller 92 may activate the light assembly 34 at a neutral intensity in conjunction with the vehicle backup lamps 66. According to various embodiments, the light assembly 34 may illuminate in a first color when the transmission is in park, a second color when the vehicle 28 is in reverse, a third color in drive, and/or a fourth color when the transmission is in neutral. The second color may be white such that the light assembly 34 illuminates in conjunction with the vehicle backup lamps 66. Moreover, the light assembly 34 may provide additional illumination rearwardly and/or laterally outward of the vehicle 28 when the vehicle 28 is moving at slow speeds to provide additional illumination of proximately disposed objects.

The braking module 112 may monitor the speed of the vehicle 28. However, it will be appreciated that any other device and/or sensor within the vehicle 28 may additionally and/or alternatively be utilized for determining the speed of the vehicle 28 without departing from the scope of the present disclosure. According to various embodiments, the controller 92 may increase or decrease the intensity of light emitted from the one or more light sources 80 depending on the speed of the vehicle 28. For example, when the vehicle 28 is traveling below a predefined speed (e.g., three miles per hour (mph)), a first intensity of light may be emitted from one or more of the light sources 80. Conversely, when the vehicle 28 is traveling above the predefined speed, a second, higher intensity of light may be emitted from the one or more light sources 80. Alternatively, a higher first intensity of light may be emitted below the predefined speed while a second, lower intensity of light is emitted once the vehicle 28 exceeds the predefined speed. The controller 92 may modify the intensity of the emitted first and second wavelengths of excitation light 24 by pulse-width modulation or current control. According to various embodiments, the intensity of light emitted from the light sources 80 may be increased to five times the original intensity.

The light-detecting device 114 may be integrated into the vehicle 28 and/or the light assembly 34. The light-detecting device 114 senses the environmental lighting conditions, such as whether the vehicle 28 is in day-like conditions (i.e., higher light level conditions) and/or whether the vehicle 28 is in night-like conditions (i.e., lower light level conditions). The light-detecting device 114 can be of any suitable type and can detect the day-like and night-like conditions in any suitable fashion. For instance, in various embodiments, the light-detecting device 114 includes a light sensor that detects the amount of light (e.g., solar radiation) affecting the vehicle 28 for determining whether day-like or night-like conditions exist. According to various embodiments, a lower initial intensity of excitation light 24 may be emitted by the light source 80 when the light-detecting device 114 senses night-like conditions. A higher initial intensity of excitation light 24 may be emitted when the light-detecting device 114 senses day-like conditions.

Referring still to FIG. 9, the vehicle 28 may further include the door sensor 116 that is configured to determine whether a door has been opened and/or closed. In some instances, the door sensor 116 may include a switch or proximity sensor such as a Hall-effect sensor. The door sensor 116 may be configured to output a door state signal. When the door is closed, the door state signal may indicate a closed state (i.e., the door is closed). When the door is open, the door state signal may indicate an open state (i.e., the door is open). The system may include any number of door sensors 116. At least one door sensor 116 may be disposed on each door. In addition, door sensors 116 may be located on a hood, a trunk, a lift gate, and possibly other locations throughout the vehicle 28 such as lockable storage compartments. According to various embodiments, when the door sensor 116 detects an open state, and an exterior sensor detects an approaching vehicle, object, and/or person, the light assembly 34 may flash in any desired color to notify an approaching vehicle, object, and/or person of the opening of the door.

The steering wheel position sensor 118 may be any type of sensor known in the art and may monitor the rotational change of the steering wheel 52. According to various embodiments, as the steering wheel 52 is rotated in one direction, the light sources 80 within the light assembly 34 corresponding to the same side 54, 56 of the vehicle 28 may progressively illuminate from an inboard first portion of light sources 80 to a second portion of light sources 80 outboard of the first portion. As discussed above, the illumination pattern 38 may extend rearwardly and/or laterally outward of the turn signal light cone 48.

The exterior sensor(s) 124 can include mechanisms and/or sensors, such as RADAR, LIDAR, sonar, etc., that can be deployed to provide any desired information about the vehicle 28. For example, the exterior sensors may sense when the vehicle 28 has less than optimal traction, a flat tire, or any other malfunction. In response, the controller 92 may activate the light assembly 34 to provide additional illumination to the vehicle 28. The light assembly 34 may flash in any color, such as an amber color.

Similarly, a camera 122 may be disposed around the exterior of the vehicle 28 and provide an image of proximately disposed objects on a display within the vehicle 28. The camera 122 includes an image sensor having an area type image sensor such as a CCD or a CMOS image sensor and image-capturing optics (not shown), and captures an image of an imaging field of view defined by the image-capturing optics. According to various embodiments, the generated images may within the fields of view of the one or more cameras 122 so that the driver may be able to view the generated images outside of the vehicle 28 and/or on the HMI 120.

In operation, the light sources 80 may be activated using a variety of means. For example, the vehicle 28 may include a user interface 126. In some instances, the user interface 126 may be part of the HMI 120 disposed within the vehicle 28, or the user interface 126 may work in conjunction with the HMI 120. The user interface 126 may be configured such that a user may control the wavelength of excitation light 24 that is emitted by the light source 80 and/or the illumination pattern 38 emitted from the light assembly 34. Additionally, or alternatively, the user interface 126 may be used to switch the light assembly 34 through a plurality of modes and/or functions. The user interface 126 may use any type of control known in the art for controlling the light source 80, such as, but not limited to, switches (e.g., proximity sensors, push-type buttons) and may be disposed in any practicable location.

A variety of advantages may be derived from the use of the present disclosure. For example, use of the light assembly disclosed herein provides additional information about the vehicle to nearby vehicles. The light assembly may be activated when the vehicle steering wheel is rotated and a vehicle turn signal indicator lever has not been activated. Moreover, the light assembly disclosed herein provides additional illumination around a rear portion of the vehicle for improved aesthetics, functionality, and perceived quality. The light assembly may be manufactured at low costs when compared to standard vehicle light assemblies.

According to various embodiments, a light assembly is provided herein. The light assembly includes a pair of light assemblies disposed on opposing sides of a rear portion of a vehicle. Each light assembly includes a housing and a lens. A light source is disposed in the housing and is configured to create a first predefined illumination pattern. A controller is configured to selectively activate the first illumination pattern from one of the pair of housings corresponding to a direction of a vehicle steering wheel rotation. The light assembly may be configured as a vehicle light assembly. Embodiments of the light assembly can include any one and/or a combination of the following features:

- the controller activates various illumination patterns based on a vehicle transmission state;
- the pair of light assemblies emit a first intensity of light when the vehicle is moving below a predefined speed and a second lower intensity when the vehicle exceeds the predefined speed;
- the pair of light assemblies illuminates in conjunction with a vehicle backup lamp as the vehicle moves in a rearward direction;
- the first illumination pattern is configured to emit an excitation light laterally outward of a vehicle turn signal indicator lamp;
- the first illumination pattern is visible to a vehicle disposed rearwardly of the light assembly while an intermediate vehicle is disposed between the rearwardly disposed vehicle and the light assembly;
- a luminescent structure is operably coupled with each light source and configured to luminesce in response to receiving excitation light from the light source;
- the luminescent structure includes at least one luminescent material configured to convert an excitation light received from at least a portion of a light source into a visible light;
- the light assembly includes a vehicle exterior sensor configured to detect an object disposed rearwardly of a vehicle and a door sensor, wherein the plurality of light sources are activated when the vehicle door is opened and the exterior sensor detects an approaching object;
- the light source includes a pair of LEDs aligned laterally adjacent to one another; and/or
- the plurality of light sources is activated when a vehicle steering wheel is rotated without initiation of a vehicle turn signal indicator lamp.

Moreover, the light assembly may be utilized for as a lighting method for a vehicle that includes positioning a pair of light assemblies on opposing sides of a rear portion of a vehicle, wherein each light assembly includes a housing and a lens; illuminating a light source disposed in the housing to create a first predefined illumination pattern; and selectively activating the light source through a controller to emit the first illumination pattern from one of the pair of housings corresponding to a direction of a vehicle steering wheel rotation.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle, comprising:
   a pair of light assemblies disposed on opposing sides of a rear portion of a vehicle, wherein each light assembly includes a housing and a lens;
   a plurality of light sources disposed in the housing and configured to create a first predefined illumination pattern; and
   a controller configured to selectively activate a first illumination pattern from one of the pair of housings corresponding to a direction of a vehicle steering wheel rotation, the first illumination pattern configured to illuminate an area vehicle forwardly and rearwardly of the light assembly, wherein the plurality of light sources progressively illuminate from an inboard first portion of the plurality of light sources to a second portion of the plurality of light sources outboard of the first portion as the steering wheel is rotated in one direction.

2. The vehicle of claim 1, wherein the controller activates various illumination patterns based on a vehicle transmission state.

3. The vehicle of claim 1, wherein the pair of light assemblies emit a first intensity of light when the vehicle is moving below a predefined speed and a second lower intensity when the vehicle exceeds the predefined speed.

4. The vehicle of claim 3, wherein the pair of light assemblies illuminates in conjunction with a vehicle backup lamp as the vehicle moves in a rearward direction.

5. The vehicle of claim 1, wherein the first illumination pattern is configured to emit an excitation light laterally outward of a vehicle turn signal indicator lamp.

6. The vehicle of claim 5, wherein the first illumination pattern is visible to a vehicle disposed rearwardly of the light assembly while an intermediate vehicle is disposed between the rearwardly disposed vehicle and the light assembly.

7. The vehicle of claim 1, further comprising:
   a luminescent structure operably coupled with each of the plurality of light sources and configured to luminesce in response to receiving excitation light from the plurality of light sources.

8. The vehicle of claim 7, wherein the luminescent structure includes at least one luminescent material configured to convert an excitation light received from at least a portion of a light source into a visible light.

9. The vehicle of claim 1, wherein the plurality of light sources is activated when a vehicle steering wheel is rotated without initiation of a vehicle turn signal indicator lamp.

10. The vehicle of claim 1, wherein the plurality of light sources includes a pair of LEDs aligned laterally adjacent to one another.

11. A light assembly, comprising:
- a plurality of light sources disposed within a housing on a vehicle and configured to selectively illuminate in first, second and third colors;
- a plurality of reflectors, each light source operably coupled with an independent reflector angularly offset from the remaining reflectors; and
- a controller configured to selectively illuminate the light sources in the first color when the vehicle is stationary, the second color when the vehicle moves in a first direction, and the third color when the vehicle moves in a second, opposing direction, wherein the plurality of light sources progressively illuminate from an inboard first portion of the plurality of light sources to a second portion of the plurality of light sources outboard of the first portion as the steering wheel is rotated in one direction.

12. The light assembly of claim 11, further comprising:
- a vehicle exterior sensor configured to detect an object disposed rearwardly of the vehicle; and
- a door sensor, wherein the plurality of light sources are activated when a vehicle door is opened and the exterior sensor detects an approaching object.

13. The light assembly of claim 11, further comprising:
- a luminescent structure operably coupled with the plurality of light sources and configured to luminesce in response to receiving excitation light from the plurality of light sources.

14. The light assembly of claim 11, wherein the plurality of light sources is activated when a vehicle steering wheel is rotated without initiation of a vehicle turn signal indicator lamp.

15. The light assembly of claim 11, wherein the housing is disposed within a tail lamp assembly of the vehicle.

16. A vehicle light assembly, comprising:
- a housing and a lens located on a vehicle;
- a plurality of light sources disposed within the housing and configured to emit an illumination pattern rearwardly and laterally outward of the vehicle, the illumination pattern extending further than a turn indicator light cone; and
- a controller configured to selectively illuminate the plurality of light sources when a vehicle steering wheel is rotated without initiation of a vehicle turn signal indicator lamp, wherein the plurality of light sources progressively illuminate from an inboard first portion of the plurality of light sources to a second portion of the plurality of light sources outboard of the first portion as the steering wheel is rotated in one direction.

17. The vehicle light assembly of claim 16, further comprising:
- a luminescent structure operably coupled with the plurality of light sources and configured to luminesce in response to receiving excitation light.

18. The vehicle light assembly of claim 16, wherein the housing is disposed within at least one of a bumper, a tailgate, or a body panel of the vehicle.

19. The vehicle light assembly of claim 16, wherein the plurality of light sources illuminates an area rearwardly of the vehicle and an adjacently disposed object as a passenger approaches or exits the vehicle.

20. The vehicle light assembly of claim 16, wherein the plurality of light sources emits a first intensity of light when the vehicle is moving below a predefined speed and a second lower intensity when the vehicle exceeds the predefined speed.

* * * * *